United States Patent
Harrison et al.

(10) Patent No.: US 6,789,128 B1
(45) Date of Patent: Sep. 7, 2004

(54) SYSTEM AND METHOD FOR REDUCING NETWORK TRAFFIC BETWEEN TWO COMPUTING DEVICES

(75) Inventors: Christopher Harrison, Lautignac (FR); Siddalingaiah Eraiah, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/524,424

(22) Filed: Mar. 11, 2000

(51) Int. Cl.[7] ............................................. G06F 15/16
(52) U.S. Cl. ........................................ 709/246; 707/203
(58) Field of Search .......................... 709/206, 216, 709/229, 232, 246, 219; 717/168, 172; 707/1; 710/43; 370/230; 345/158

(56) References Cited

U.S. PATENT DOCUMENTS

| | | | | |
|---|---|---|---|---|
| 5,086,402 A | * | 2/1992 | Sterling, II | 709/246 |
| 5,627,829 A | * | 5/1997 | Gleeson et al. | 370/230 |
| 5,634,052 A | * | 5/1997 | Morris | 707/1 |
| 5,752,039 A | * | 5/1998 | Tanimura | 717/168 |
| 5,793,970 A | * | 8/1998 | Fakes et al. | 709/216 |
| 5,884,097 A | * | 3/1999 | Li et al. | 710/43 |
| 5,990,867 A | * | 11/1999 | Okada et al. | 345/158 |
| 6,003,087 A | * | 12/1999 | Housel, III et al. | 709/229 |
| 6,101,531 A | * | 8/2000 | Eggleston et al. | 709/206 |
| 6,279,041 B1 | * | 8/2001 | Baber et al. | 709/232 |
| 6,389,592 B1 | * | 5/2002 | Ayres et al. | 717/172 |
| 6,578,073 B1 | * | 6/2003 | Starnes et al. | 709/219 |

* cited by examiner

Primary Examiner—John Follansbee
Assistant Examiner—Dustin Nguyen
(74) Attorney, Agent, or Firm—Park, Vaughan & Fleming LLP

(57) ABSTRACT

A system and methods are provided for reducing the size of a message sent from a first computing device to a second computing device. The type of a data value of a message may be altered for transmission; the second computer recognizes a special data type assigned to the data value and restores the original data type. Also, data values may be buffered, and identifiers (e.g., buffer indexes) sent in their place. Both devices maintain similar buffers and the second device uses the identifier to retrieve the data value. Further, the contents of a new message may be described by how they differ from the contents of a previous message. A delta message is generated to describe the differences and identify the previous message. Upon receipt of the delta message, the second computer retrieves the previous message and uses it and the delta message to reconstruct the new message.

21 Claims, 11 Drawing Sheets

SYSTEM AND METHOD FOR REDUCING NETWORK TRAFFIC BETWEEN TWO COMPUTING DEVICES

BACKGROUND

This invention relates to computer communications in a network environment. More particularly, a system and methods are provided for reducing the amount of network traffic communicated between two computer systems or other computing devices.

In a network computing environment in which one computer system must exchange information with another computer system, the amount of information flowing between the two systems may be quite large. For example, in a client/server architecture in which the client and server cooperate to execute an application for a user, the server may send a great deal of data to the client to keep it populated with relevant, updated information. Similarly, the client may send a steady stream of user actions, requests and new or updated data to the server.

The popularity of network-based applications operating over the Internet or other network, particularly database applications, may thus cause a large amount of network traffic. As the number of users operating such applications grows, the level of network traffic grows commensurately. One system in which two computer systems cooperate via a network to operate a network-based application is described in U.S. Pat. No. 6,073,163, entitled "Method and Apparatus for Enabling Web-Based Execution of an Application," filed on Jun. 10, 1997 and issued on Jun. 6, 2000.

As the level of network traffic increases, users of an application operated across the network may experience a degradation in its performance. The greater the number of network applications in operation, and the greater the number of clients that must communicate with a server, the greater the impact may be on network performance. The nature of the application can also make a significant impact. Where, for example, a user interface on a client is partially or fully managed by a server (e.g., the placement, size and appearance of windows, buttons or other objects), the amount of data that must be sent from the server to a client may be much greater than if the user interface were fixed or managed by the client. This situation may be frequently encountered when a client is a relatively "thin" device having only limited resources (e.g., memory, storage, communication bandwidth).

Compressing a network communication using a standard compression utility may be partially effective in reducing its size, but can provide only limited relief because such utilities are most effective when the information to be compressed contains repeated patterns. A series of network communications between two devices may contain repeated information but may not have the degree of repetition within a single communication that makes a standard compression utility very useful.

Thus, it is desirable to provide a mechanism and method for reducing network traffic between computer systems. It is particularly desirable to reduce the amount and/or size of communications exchanged between two computer systems that cooperate to execute a network-based application.

SUMMARY

In one embodiment of the invention a system and methods are provided for decreasing the amount of communication traffic exchanged between two computers or other computing devices by reducing the size of a message sent from one of them to the other.

In this embodiment each computer comprises a message module configured to send and/or receive messages to/from the other computer. Each message module includes a first memory configured to store data values and a second memory configured to store messages previously sent from one of the computers to the other.

In a method of reducing the size of a message in one embodiment of the invention, the sending computer examines data values included in the message. A value has an associated data type that is normally allocated a predetermined amount of space (e.g., number of bytes) in the message. If the value can be adequately represented using a different type that requires less space, then the data type is changed. Special data types may be used to represent smaller or shorter versions of standard data types (e.g., integer, point) and/or specific data values (e.g., Boolean_false may represent Boolean data having a value of false). The computer that receives the message recognizes a special data type and restores the original data type before passing the message onward for higher-level processing.

In another embodiment of the invention another method of reducing the size of a message is provided in which a data values in the message may be replaced by an identifier. In this method, a sending computer buffers or caches, in its first memory, data values (or specific forms of data such as strings) to be sent to a receiving computer. If a data value that is to be sent is already stored in the first memory, then an identifier of the data value (e.g., its index in the buffer) is sent in its place particularly if it uses less space). If not already stored, then the data value may be sent as is, in which case it is stored in the first memory of the sending computer. Upon receipt of an identifier, the receiving computer refers to its first memory to retrieve the appropriate data value based on the received identifier. If a data value is received in its normal form, it is stored in the first memory.

In yet another embodiment of the invention another method of reducing the size of a message is provided in which the contents of a new message are described by their difference(s) from a previous message. In its second memory, a sending computer stores one or more message previously sent to a receiving computer. When a new message is to be sent to the receiving computer, a previous message may be selected and a delta message generated to describe the contents of the new message in relation to the previous message. Multiple delta messages may be generated, each one from a different previous message. A delta message that is smaller than the new message may then be sent in its place. The receiving computer retrieves the previous message from its second memory and, with the delta message, reconstructs the new message.

In one embodiment of the invention a message sent from one computer to another includes a header portion, a body portion and a terminator. The header portion may identify the type of message, a type of object or component on the receiving computer to which the message applies, and/or an identity of a specific object or component. In one alternative embodiment, the header of a delta message also includes an identifier of the previous message used to generate the delta message. The body of a message includes one or more property descriptors, with each descriptor corresponding to one property of an object or component identified in the header. Each descriptor may include multiple fields, such as an identifier of corresponding property, a value associated with (e.g., to be applied to) the property, and a data type associated with the value.

DETAILED DESCRIPTION

Figure 1:
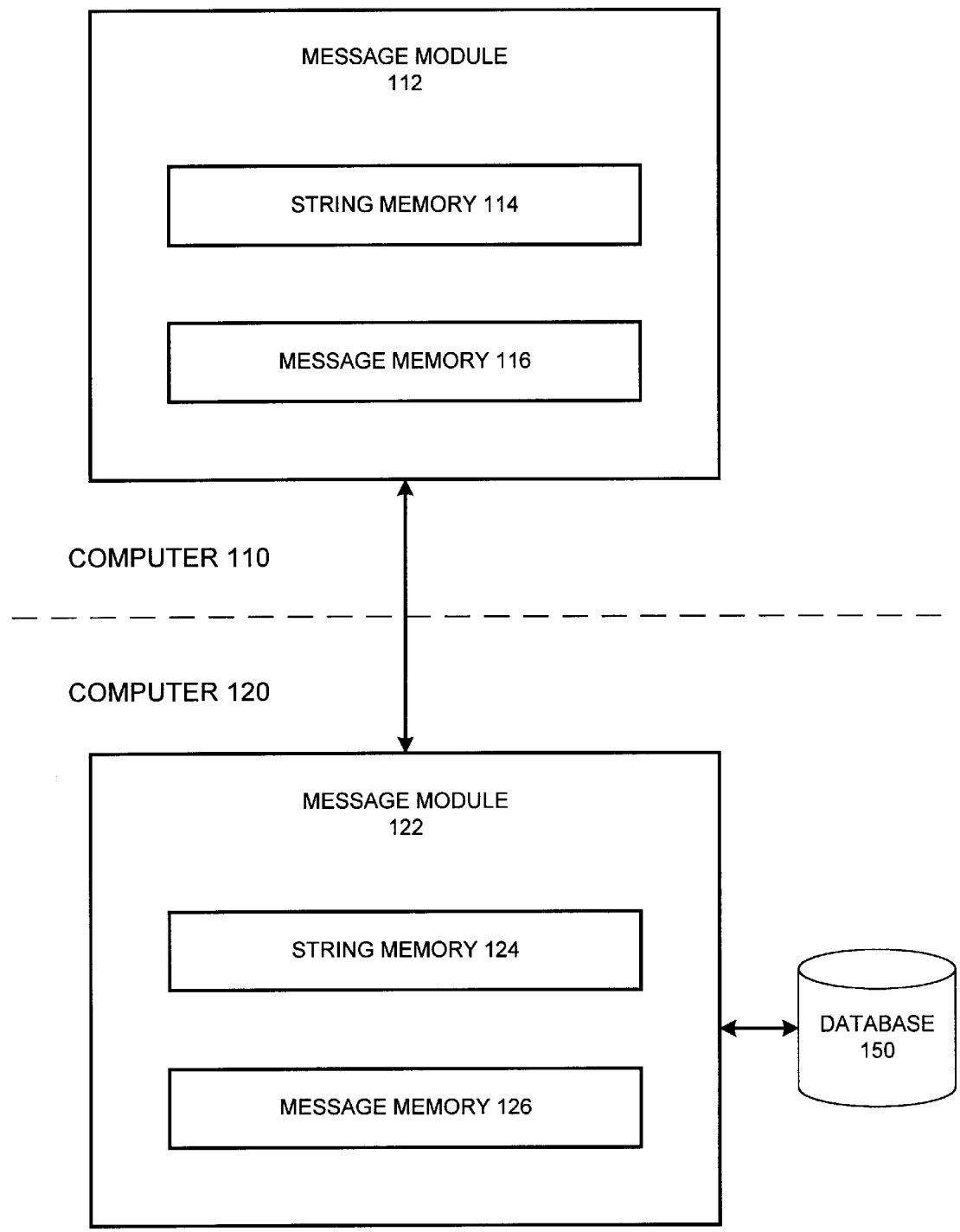
FIG. 1 is a block diagram of two computers cooperating to operate a network-based application in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed may incorporate a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and method are provided for reducing the amount of network traffic exchanged between two computer systems. In one particular implementation of this embodiment the computer systems are a client and a server computer that cooperate to execute a network or web-based database application. The client may be any type of computing device, such as a workstation, desktop computer, notebook, smart phone, and the like, that has a processor and is capable of communicating with another computer system. Illustratively, the server is an application server operating a database application to allow the client computer to access data that is stored on the application server or a separate database accessible through the application server.

In this embodiment of the invention a relatively large amount of data or information may need to be communicated from one of the computers to the other. For example, when the client and server computers cooperate to execute a network-based database application, the server may send a large number of messages to the client containing requested or updated data. Further, in some network-based applications the configuration or alteration of a client's user interface (or portions thereof) may be controlled, altered or updated by the server. In particular, the server may be responsible for creating, updating or removing objects on the client (e.g., components of the user interface such as windows, buttons, text). For example, the server may direct the client to update data in a text box, create a new window, change an attribute of a particular object, etc.

Thus, in an computing environment in which one computer system sends frequent and/or large communications to another computer system, an embodiment of the invention may be applied to reduce the amount or size of those communications. Performance of the computer systems and/or the network application may improve as a result.

The term "message" is used herein to encompass any sort of communication that one computer may send to another. For example, a message may be a standard form of communication (e.g., an Ethernet frame) or a proprietary or specialized form of transmitting information from one computer to another.

In an embodiment of the invention any or all of three schemes for reducing the size of a message sent from one computer to another may be applied. These methods are described in detail in the following sections, but may be briefly described as follows.

In a first method for reducing the size of a message, data values in the message may be compacted to save space. In particular, a message being transmitted between the computers includes one or more data fields that hold data values (e.g., data retrieved from a database, Boolean values, Cartesian coordinates). A separate data type field may identify the type or format of a particular data value (e.g., integer, Boolean, point). In this method, a data type may be changed from one type that requires a predetermined amount of storage space for the associated data value into a different type that requires less space. For example, a value expressed in a standard integer type may normally be allocated four bytes of space in the message. Via this method of reducing the size of the message, however, if the value does not require all four bytes it may be reduced to a two-byte, one-byte or even a null value by using a different data type. The receiving computer recognizes the reduced data type and restores the data value to its pre-reduced type.

In another scheme for reducing the size of a message, a character string (e.g., a sequence of alphanumeric characters) in a message may be replaced by a smaller (e.g., one-byte) identifier. In this method a string memory (e.g., buffer, cache) is maintained and is used to store a certain number (e.g., 256, 512, 1024) of the most recent character strings sent from a first computer to a second computer. Each time a string is to be sent that is not already stored in the string memory, the string is stored in the memory and associated with an identifier (e.g., a numeric value representing an index of the string in the memory). When the string is next sent to the second computer, if it is in the string memory it is replaced by the identifier. The second computer treats each string it receives from the first computer in a similar manner by storing it in its own string memory. When an identifier is received instead of a string, the second computer extracts the identifier and refers to its memory to restore the character string.

In the third scheme, a new message from a first computer to a second computer is compared to one or more messages previously sent from the first computer to the second computer. A delta message is generated based on the comparisons to describe the contents of the new message as they differ from a previous message. Delta messages may be generated for any number of previous messages, and the shortest delta message, if it is shorter than the new message, is sent in place of the new message. An identifier (e.g., sequence number, message identifier) of the previous message is included in the delta message. The second computer receives the delta message (e.g., from message memory) and applies the changes described in the delta message to reconstitute the new message.

FIG. 1 depicts an illustrative computing environment in which an embodiment of the invention may be practiced. In FIG. 1, computers 110, 120 may be any types of computer systems, but in one particular embodiment of the invention computer 110 is a client and computer 120 is a server, such as an application server operating a network database application on behalf of, and in cooperation with, one or more clients. In such an embodiment client 110 may be a low-resource computing device such as a network computer, a portable computing device, a smart phone, etc. In other embodiments, however, computer 110 includes a robust set of resources.

Computers 110, 120 include message modules 112, 122, respectively, for sending and/or receiving messages. Other portions of computers 110, 120 that may be used to cooperatively operate an application are omitted for the sake of clarity. In this embodiment each message module includes memories (e.g., buffers, caches) for storing character strings and previous messages sent to or received from the other computer. Thus, message module 112 of computer 110 includes string memory 114 and message memory 116 for storing character strings and previous messages, respectively, that are received from computer 120. Similarly, message module 122 of computer 120 includes string memory 124 and message memory 126 for storing character strings and previous messages sent to computer 110. The memories depicted within a single message module may be separate or may be part of a common memory of the host computer. Database 150 is accessible through message module 122 and may be part of computer 120 or may be located in a separate data server.

One system in which a client computer cooperates with another computer system to operate a network-based application is described in U.S. Pat. No. 6,073,163, entitled "Method and Apparatus for Enabling Web-Based Execution of an Application," which was filed on Jun. 10, 1997 and issued on Jun. 6, 2000, and is hereby incorporated by reference. In U.S. Pat. No. 6,073,163, a client and a server exchange various messages to coordinate operation of the application. In particular, a client system may submit to the server event messages and requests for data. The server sends messages to the client to alter the appearance or contents of a component of a user interface displayed on the client. An embodiment of the present invention is particularly suited for use with the system described in U.S. Pat. No. 6,073,163, in order to reduce the magnitude of network traffic that must be conveyed between the server and client.

Figure 2:
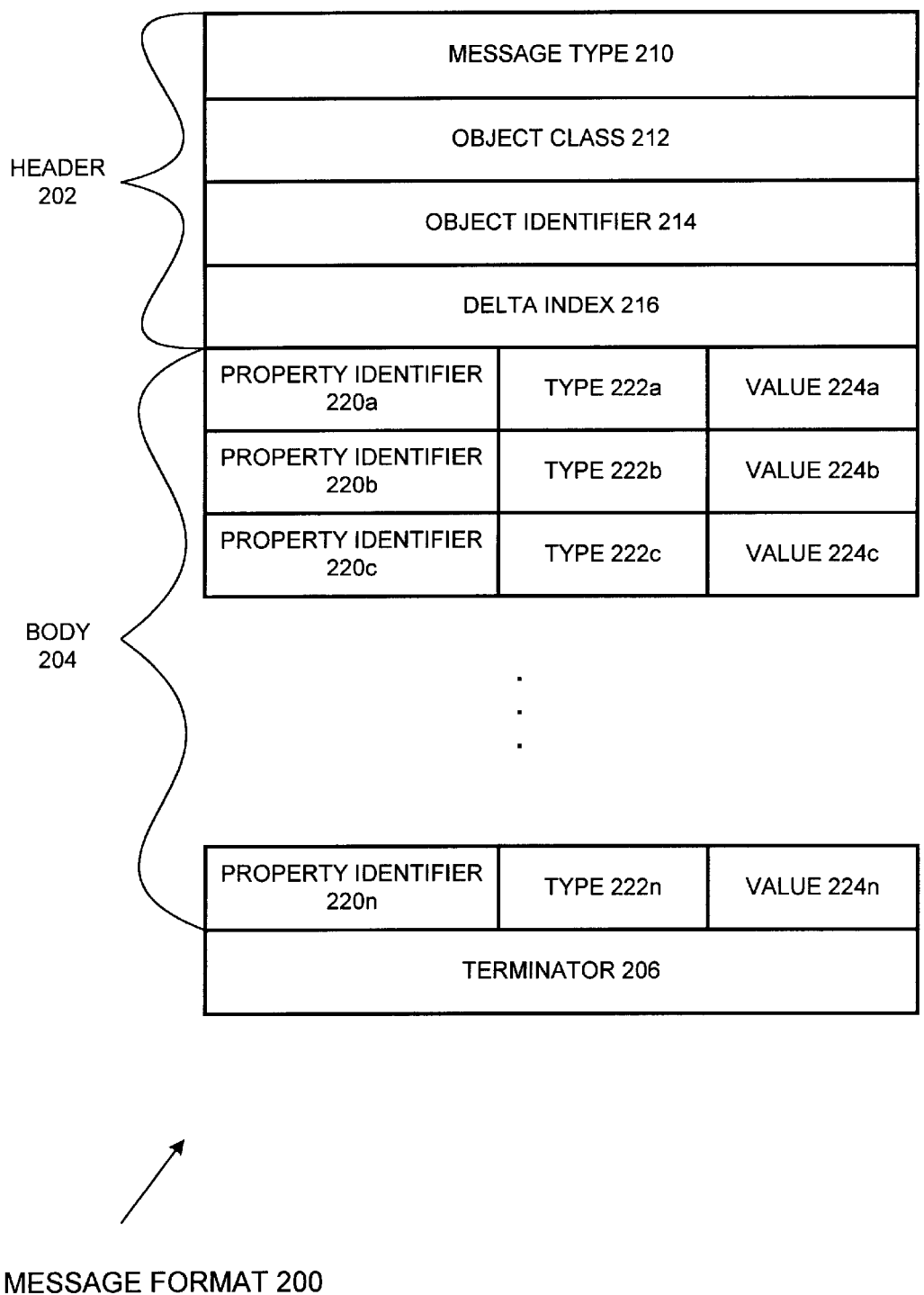
FIG. 2 is a block diagram demonstrating one format for messages exchanged between two computers in accordance with an embodiment of the invention.

FIG. 2 depicts an illustrative message format, suitable for the embodiment of the invention of FIG. 1, for messages sent between computer 110 and computer 120.

A message sent from computer 120 to computer 110 in a present embodiment of the invention according to message format 200 of FIG. 2 includes two major portions, header 202 and body 204, plus terminator 206. Terminator 206 may simply comprise a unique series of symbols signifying the end of a message. Illustratively, each message pertains to a particular object on the sending or receiving computer.

In one embodiment of the invention a message adhering to message format 200 may pertain to a single component (e.g., object) of the user interface of computer 110. For example, client computer 110 may send a message to server 120 to inform the server of a data value supplied by a user through a particular component (i.e., object) of a user interface. Or, the server may send a message to the client to create, alter or delete an object.

Header 202 of a message from server 120 to client 110 in the illustrated embodiment includes message type 210, object class 212, object identifier 214 and delta index 216. Illustratively, message type 210 indicates the type of message being transmitted and may be one of four types: create, update, get or destroy. The different types indicate the action that is to be applied to or on behalf of an object on client 110. Object class 212 identifies the class of object to which a message applies, while object identifier 214 identifies the particular object. Object classes may include windows, buttons, dialogs, menus, tab pages, text items, check boxes, type controls, images, sounds, scroll bars, timers, prompts, etc. Object identifier 214 may be a numerical value or alphanumeric code representing a particular object of the specified class.

Delta index 216 is used, as discussed in a following section, to identify a previous message sent from server 120 to client 110. As discussed below, a new message from the server to the client may be sent as a delta message that is smaller in size than the new message. In the delta message, the contents of the new message are communicated by describing their differences from the contents of the previous message.

Body 204 of message format 200 includes one or more property descriptors, each of which consists of three fields: property identifier 220, type 222 and value 224. Thus, property identifier 220a, type 222a and value 224a comprise one property descriptor of message format 200. Illustratively, each property descriptor corresponds to one property of the object identified by object class 212 and object identifier 214. In one embodiment of the invention a message is limited to a predetermined number of property descriptors (e.g., sixteen), but in an alternative embodiment a message may comprise virtually any number of property descriptors.

Property identifier 220 identifies a property (e.g., a foreground or background color of a user interface component) of the object identified in header 202. Type 222 identifies the type of data stored in value 224, and value 224 stores the data for the specified property (e.g., a text value for a button, a numerical value for a data window). In one embodiment of the invention type 222 may reflect a standard data type (e.g., integer, Boolean, string) and/or other specialized or custom data types. As described in a following section, a property type may be replaced in one embodiment of the invention with another property type that allows the property value to be stored in less space. In another embodiment of the invention a string value in value field 224 may be replaced with an identifier or memory index that substitutes for the string.

A Method of Compacting Data Values

In one embodiment of the invention a method is provided for reducing the size of a message sent from one computer to another by compacting a data value so that it may be stored in less space within the message. In particular, a data value having a type that calls for a particular amount of space (e.g., number of bytes) may be stored as an alternate type that requires less space.

In a present embodiment of the invention a message may include data corresponding to any/all of the following data types: string, array of strings, integer, byte, array of bytes, date, float, point (e.g., a point in two-dimensional space—such as on a computer display), rectangle, void, Boolean, sub-message. Other types may be possible in other embodiments of the invention.

In this embodiment each new message that is generated on computer 120 for computer 110 is examined to determine if it contains data values that may be compacted. In one implementation, only data of the following types are candidates for compaction, depending on their particular values: integer, Boolean and point. However, in alternative embodiments of the invention data of other types may also be compacted.

Figure 3:
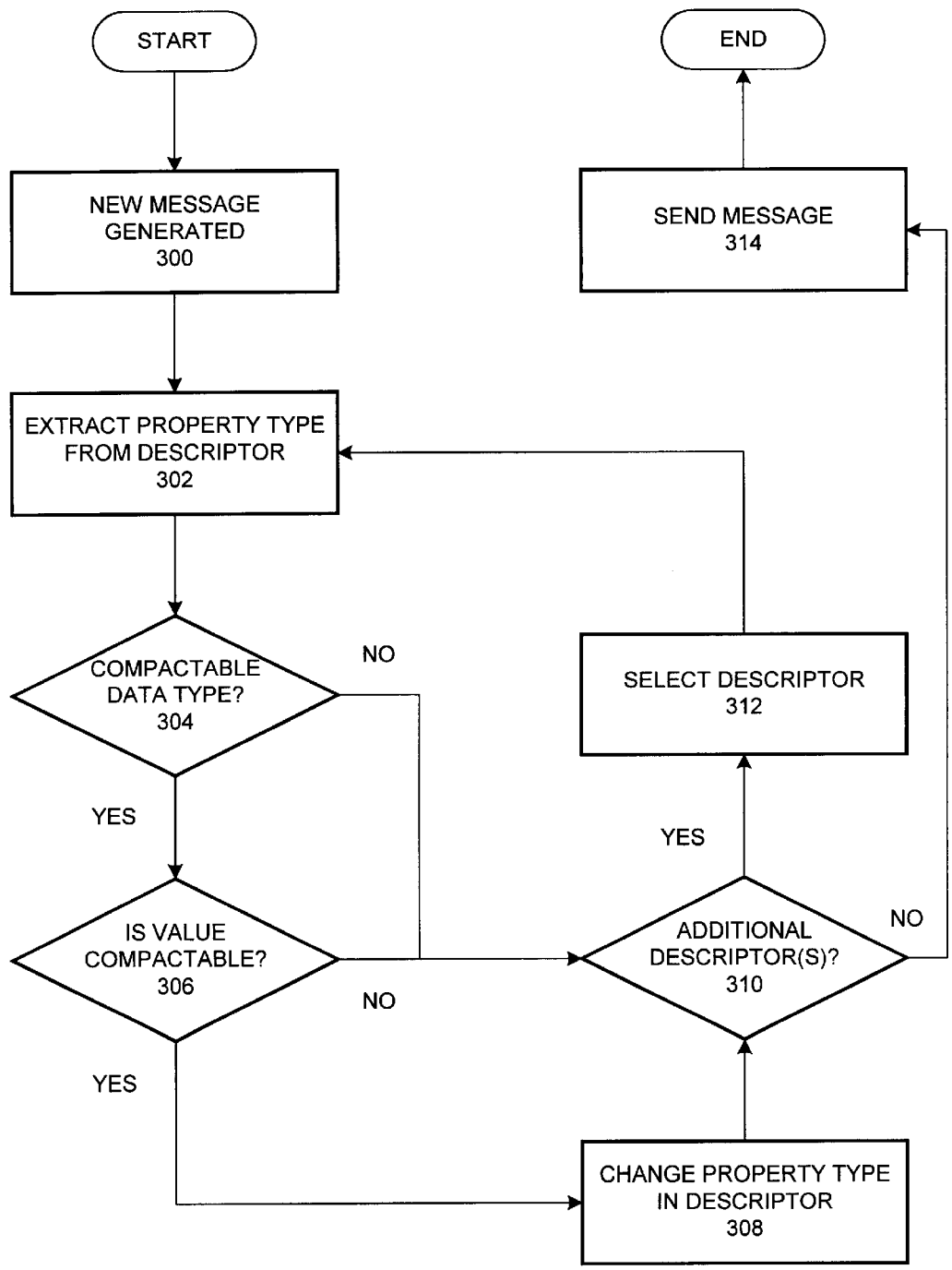
FIG. 3 is a flowchart illustrating one method of reducing the size of a message sent from one computer to another by compacting a data value of the message, in accordance with an embodiment of the present invention.

FIG. 3 illustrates one procedure for compacting one or more data fields in a message to be sent from computer 120 to computer 110 in the embodiment of the invention depicted in FIG. 1.

In state 300, a new message is generated by computer 120 to create, alter or access an object on computer 110 (e.g., a component of a user interface). At this point the message may comply with message format 200 of FIG. 2 or may simply comprise one or more individual elements of a message depicted in FIG. 2. In particular, the new message includes one or more property descriptors, with each descriptor comprising a property identifier field, a value field and a data type field. The type field reflects the type of data to which the value corresponds (e.g., integer, Boolean, string).

In state 302 a descriptor of the new message is accessed and, in state 304, it is determined whether the type field of the descriptor indicates that the data value is a candidate for compaction. In the illustrated procedure the indicated type is examined to determine if it is integer, Boolean, or point. In one embodiment of the invention an integer is normally allocated four bytes of storage space, a Boolean value is allocated one byte and a point value is allocated eight bytes (i.e., four bytes for each integer coordinate of the point). If the indicated type is not one of those that may be compacted, the procedure continues at state 310.

Otherwise, in state 306 the data value (e.g., in data field 224 of message format 200) is examined to determine if it can be compacted. Illustratively, an integer value is examined to determine if it is a value that can be fully represented with less than four bytes. In one embodiment an integer is compacted if it can be stored in just one or two bytes. An integer may also be tested for specific values that are frequently transmitted; thus, in one embodiment of the invention the integer is examined to determine if it is the value zero or one.

A Boolean value is examined to determine whether it represents a true or false value. A point value is examined to determine if it can be stored in fewer than eight bytes. In particular, in one embodiment of the invention a point value is compacted if it can be stored in two bytes (i.e., each coordinate of the point getting one byte). In another embodiment of the invention a point value may be compacted if it can be stored in any number of bytes less than its normal allocation (e.g., eight bytes).

If the integer, Boolean or point value is found not to be compactable in state 306, the illustrated procedure continues at state 310.

In state 308 the type field for the data in the selected property descriptor is altered. In different embodiments of the invention different data types are used to substitute for the compacted integer, Boolean or point value. In one embodiment, one or more of the following special data types are possible: integer_byte, integer_short, integer_0, integer_1, Boolean_true, Boolean_false and point_byte. Other special or customized types are possible in other embodiments of the invention. The appropriate special data type is substituted for the type specified in the property descriptor, as follows.

In this embodiment, if an integer (e.g., that normally is allocated four bytes) can be stored by one byte, its type is changed to integer_byte. If an integer can be stored in two bytes, its type is changed to integer_short. If the integer is one of the common values of zero or one, its type is changed to integer_0 or integer_1 accordingly. Any particular integer value may be assigned its own type if the value is common enough to warrant it. In one implementation of this embodiment of the invention; only the integer value of zero is assigned its own type.

For a Boolean value, its type is replaced with Boolean_true or Boolean_false, depending on the value. If a point value can be represented using just two bytes (i.e., one byte for each coordinate component), its type is changed to point_byte. For the special types integer_0, integer_1, Boolean_true and Boolean_false, in one embodiment of the invention no data value is communicated (e.g., value field 224 of message format 200 is empty or is eliminated) because the data value is communicated as part of the type.

In state 310 it is determined whether the new message contains any descriptors that have not been examined and tested for compactability. If so, a new descriptor is selected in state 312 and the illustrated procedure returns to state 302. Otherwise, in state 314 the message is transmitted to the receiving computer (e.g., computer 110 of FIG. 1). State 314 may occur after one or more other methods for reducing the size of a message are applied.

When the message is received at computer 110, it passes through a complementary procedure in which each property descriptor is examined for the special compacted data types described above. If one of the special data types is indicated, computer 110 restores the original data type and value.

As mentioned, in one alternative embodiment of the invention data types other than integer, Boolean and point may be compacted. For example, in one alternative embodiment of the invention a data value of the type rectangle (e.g., a sequence of points) may be compacted if, for example, one or more points in the rectangle data require less than their normally allocated amount of space.

A Method of Buffering Data Values

In one embodiment of the invention a method of reducing the size of a message is applied in which a sequence of characters or symbols is replaced with an identifier. In one implementation of the method every character string (e.g., sequence of alphanumeric and typographical characters) is a candidate for replacement with a small (e.g., one byte) identifier. In this implementation the use of a one-byte identifier allows 256 different strings to be replaced. In other implementations the identifier may be of a different size.

Every time a string is added or is to be added to a message—such as when the elements of a new property descriptor are assembled—it is compared with one or more strings stored in a string memory (e.g., string memory 134 of FIG. 1). If it matches one of the strings then an associated identifier (e.g., the index of the string within the memory) is sent in its place. In one embodiment of the invention a special data type is associated with the identifier and is stored in the property descriptor, in the data type field associated with the replaced string value.

If a string that is to be added to a message is not in the string memory, then it is added to the memory and associated with an identifier, but the string is sent normally (i.e., without being replaced). A suitable algorithm (e.g., least recently used) may be applied to remove a string from memory when one is to be stored.

On the receiving computer, when a special data type associated with a buffered data type is detected the computer uses the associated value (i.e., the string identifier) to retrieve the correct string from a string memory (e.g., string memory 114 of FIG. 1). Otherwise, when a string is received it is stored in the string memory using the same algorithm applied on the sending computer.

Figure 4:
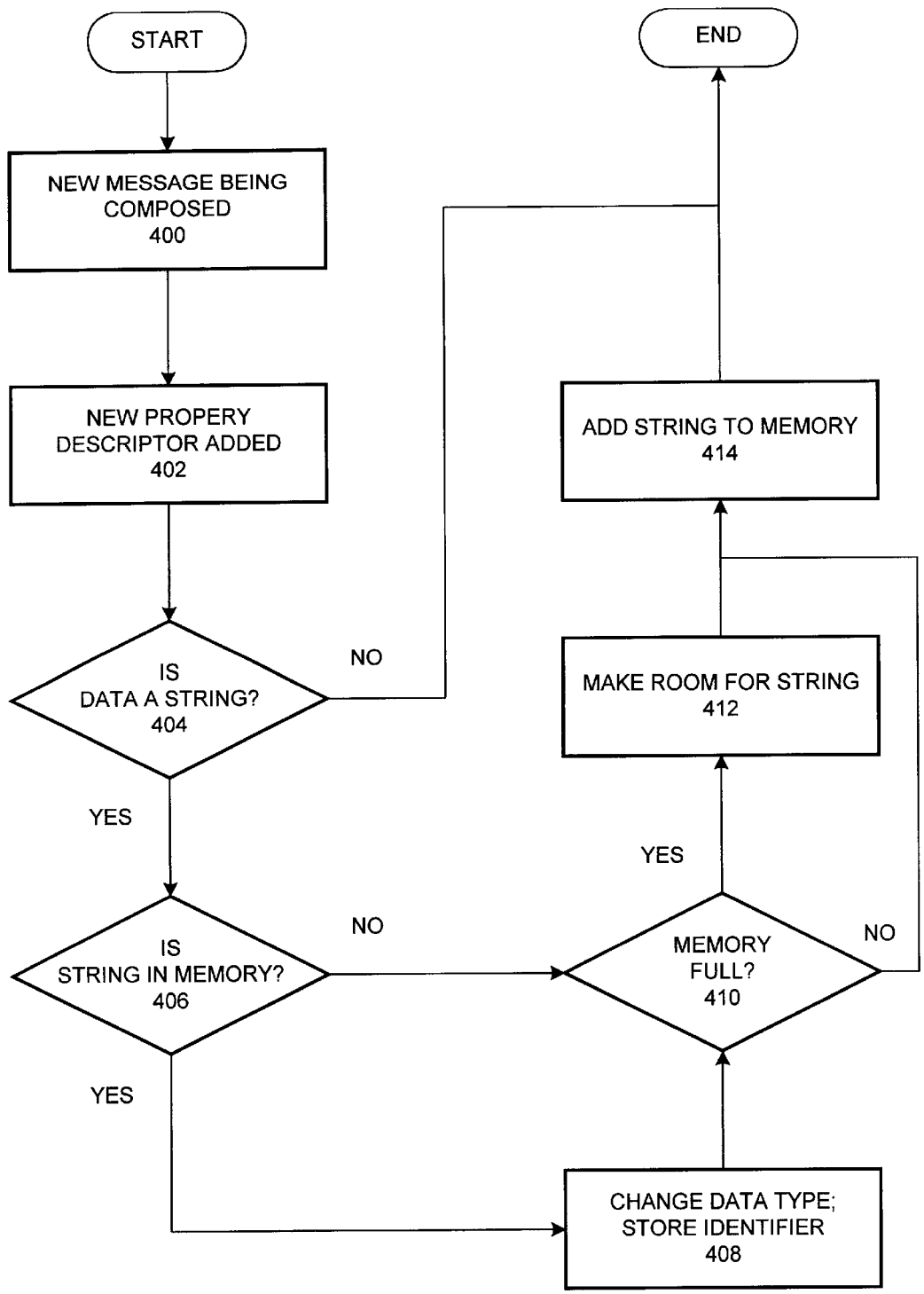
FIG. 4 is a flowchart illustrating one method of reducing the size of a message sent from one computer to another by buffering data included in the message, in accordance with an embodiment of the present invention.

FIG. 4 depicts an illustrative procedure for buffering a character string to be sent in a message from computer 120 to computer 110 in the embodiment of the invention depicted in FIG. 1. Although this method of the invention is described for use in buffering character strings, other types or sequences of computer-readable symbols may be buffered in other embodiments.

In state 400 a new message is being generated for transmission to computer 110 from computer 120. In state 402 a property descriptor to be added to the message, or the set of elements of such a property descriptor, is examined. As described in a previous section, a property descriptor illustratively includes a property identifier field identifying a property of an object on computer 110, a data value field concerning the property and a data type field describing the data value.

In state 404 the data value and/or type of the data value of the property descriptor are examined to determine if the value is one of the types to be buffered. In this embodiment of the invention the procedure ends if the data type is not a sequence of alphanumeric and/or typographical characters (e.g., not a character string).

If the data type is a character string, then in state 406 the data value (i.e., the character string) is compared to the strings stored in the string memory of computer 120. In one embodiment of the invention the memory is configured to store a predetermined number of strings (e.g., 256). In other embodiments virtually any number of strings may be stored. One advantage of storing a maximum of 256 strings is that an identifier of each string can be represented using just one byte. Identifiers may, however, be of other sizes in alternative embodiments of the invention. If the string is not in the memory, then the illustrated procedure proceeds to state 410.

Otherwise, in state 408 the data type in the property descriptor is changed to a special type called Buffer_String that will be recognized by computer 110 as indicating that the associated data value is an identifier of the original string. In this embodiment of the invention the identifier comprises an index into the string memory of computer 110. Also in state 408, the data value of the property descriptor is changed to the value of the identifier (e.g., index).

In state 410 it is determined whether the string memory is full. In one embodiment of the invention every string generated for a property descriptor is stored in the string memory, whether or not it is already stored in the memory. Thus, in this embodiment it can be ensured that all of the most recently communicated strings, up to the size of the memory, are retained. In one alternative embodiment, however, a string is only stored in the string memory if it is not already stored. The memory may be implemented as a circular queue or other suitable data structure.

If the memory is full, the illustrated procedure continues at state 412; otherwise the procedure advances to state 414.

In state 412 an entry in the memory is replaced with the present string. In an embodiment of the invention in which the memory is implemented as a circular queue, each string is stored in the queue in the order it is encountered. In another embodiment of the invention in which a string is only stored once in the memory, when a string is repeated a memory field associated with the string is updated to indicate its recent use in a message. Illustratively, this is done so that an algorithm such as least recently used may be employed to identify an old memory entry for removal when a new one must be stored.

In state 414 the string is added to the string memory of computer 120. After state 414 the illustrated procedure ends.

When the message containing the altered property descriptor is received at computer 110, each descriptor is examined. When a descriptor having a data type of Buffer_string is encountered, computer 110 uses the associated data value as an index into its own string memory to retrieve the original string. The original string is then restored and passed on to the message recipient or otherwise used by the message module of computer 110.

The string memory of computer 100 may be managed in a similar fashion to that of computer 120. Thus, every string received by computer 110 is stored in its string memory, just as computer 120 did with each string found in a property descriptor. In one embodiment each "normal" string (i.e., one that has not been replaced by an identifier) is stored in the memory when it is encountered. For buffered strings, after the appropriate string is retrieved from string memory based on an identifier, the string is retained or stored again in the string memory.

A Method of Substituting a Delta Message for a New Message

In one embodiment of the invention a new message to be sent from one computer to another may be reduced in size by replacing it with a delta message. In this embodiment a delta message describes the contents (e.g., properties) of the new message as they differ from a previous message sent from the one computer to the other. The receiving computer recognizes the delta message (e.g., by its message type and/or a delta message index field) and restores the contents of the new message by applying or combining its differences with or changes to the previous message.

In order to enable delta messages, each computer maintains a memory in which it stores previous messages. Thus, as depicted in FIG. 1, computer 120 maintains message memory 126 to store one or more messages previously sent to computer 110, while computer 110 maintains message memory 116 to store messages received from computer 120. In one implementation each memory is configured to store up to a predetermined number of messages. In alternative implementations, however, a message memory may be configured to store virtually any number of messages. In addition, a computer may include multiple message memories—such as a separate memory for each computer that it sends messages to and/or a separate memory for each computer that it receives messages from. Also, a computer may include separate message memories for different types of messages (e.g., create, update, delete and get messages and perhaps delta messages as well), or one message memory may include different types of messages. In one embodiment of the invention a message memory stores up to four messages.

Illustratively, when a new message is generated or is in the composition process, its contents are compared to one or more previously sent messages that are stored in a message memory. A delta message may be created for one or more of the stored messages. As long as one of the delta messages is smaller than the new message, the (smallest) delta message is sent in its place.

Figure 5:
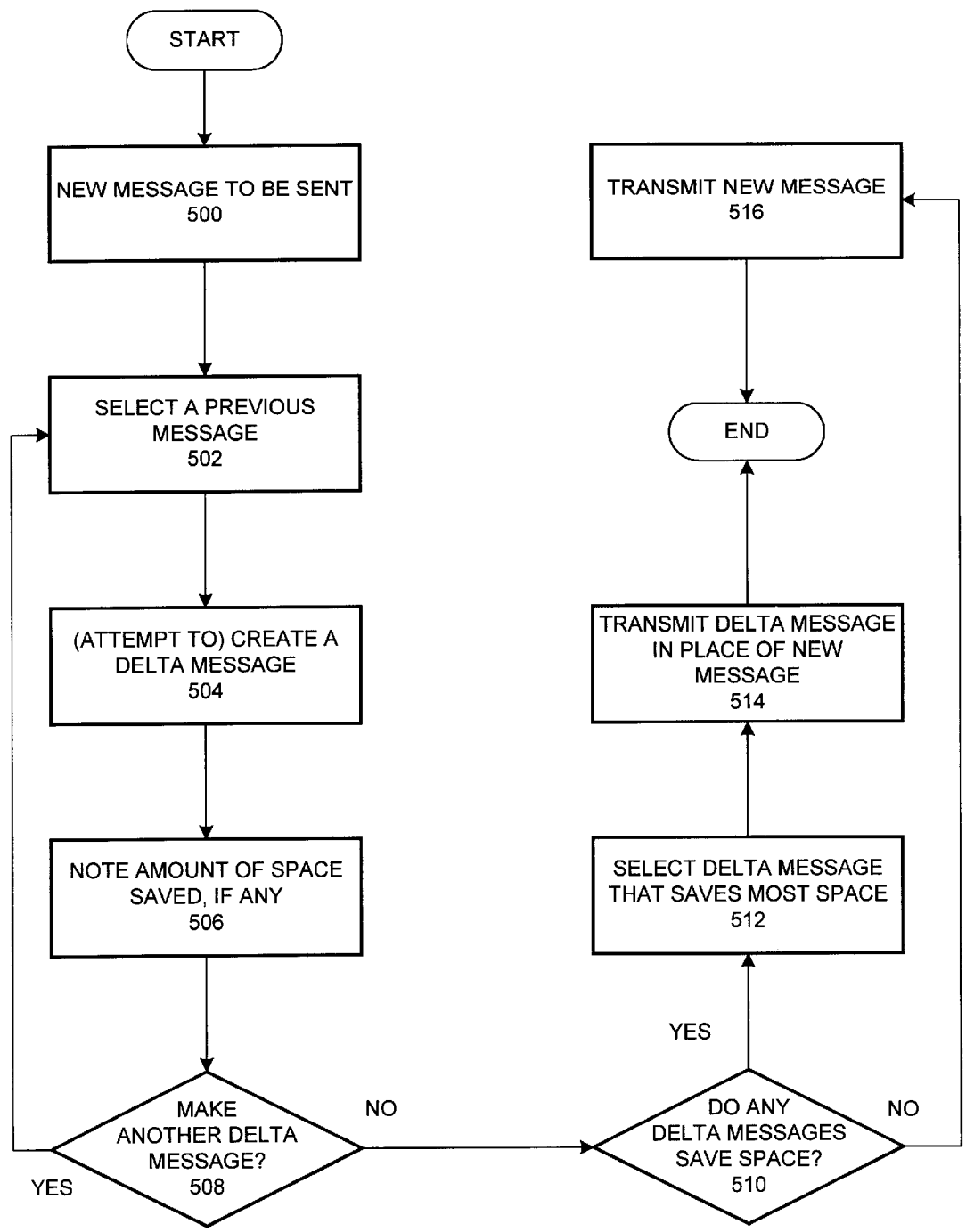
FIG. 5 is a flowchart demonstrating one method of selecting a delta message to be sent in place of a new message from a first computing device to a second computing device in accordance with an embodiment of the present invention.

One method of creating and using a delta message to replace a new message intended for transmission from computer 120 to computer 110 in the embodiment of the invention of FIG. 1 is illustrated in the flowcharts of FIGS. 5–7.

Figure 6A:
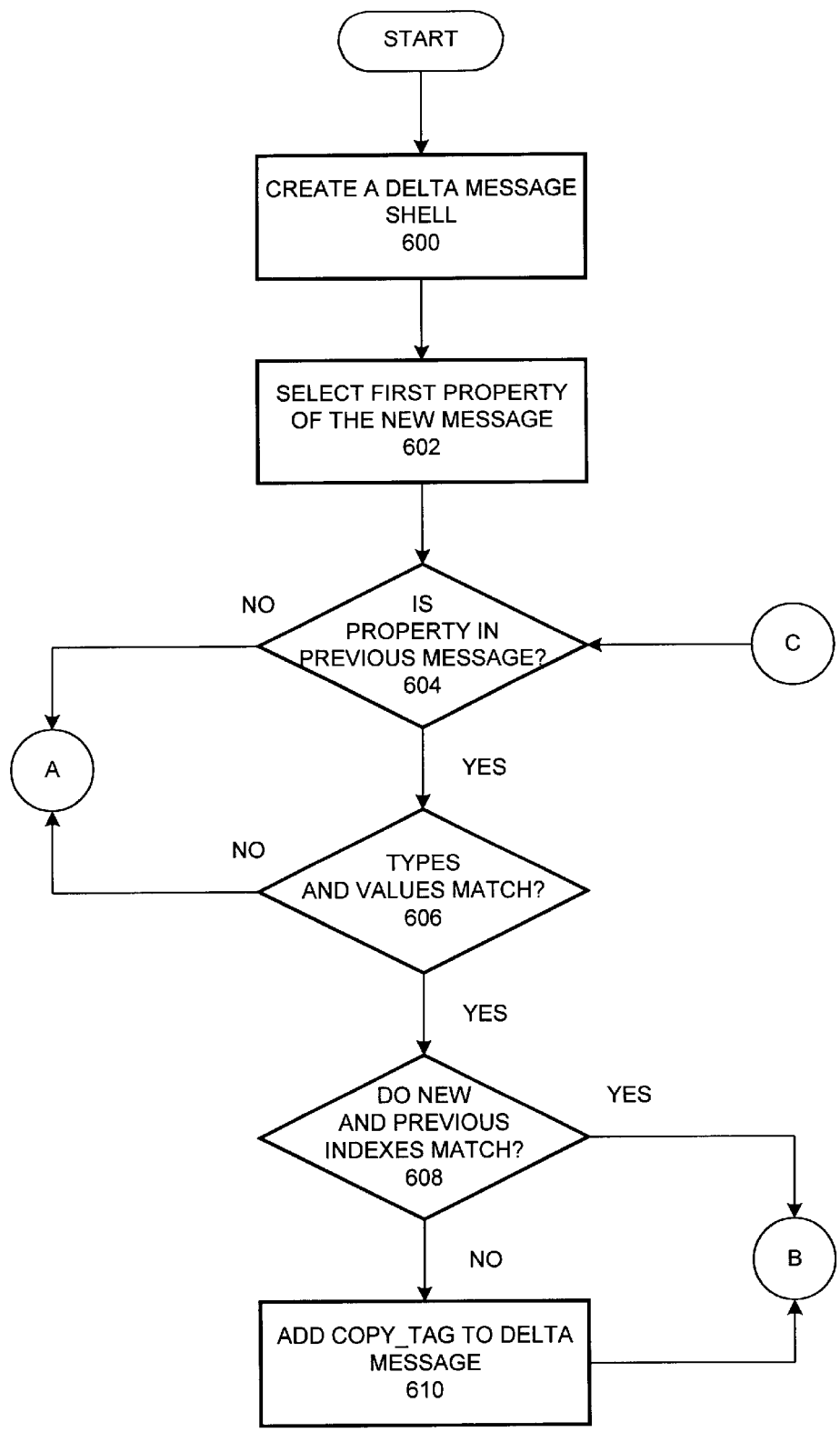
FIGS. 6A–6B comprise a flowchart demonstrating one method of generating a delta message for a new message from a first computing device to a second computing device based on a previously sent message in accordance with an embodiment of the present invention.
Figure 6B:
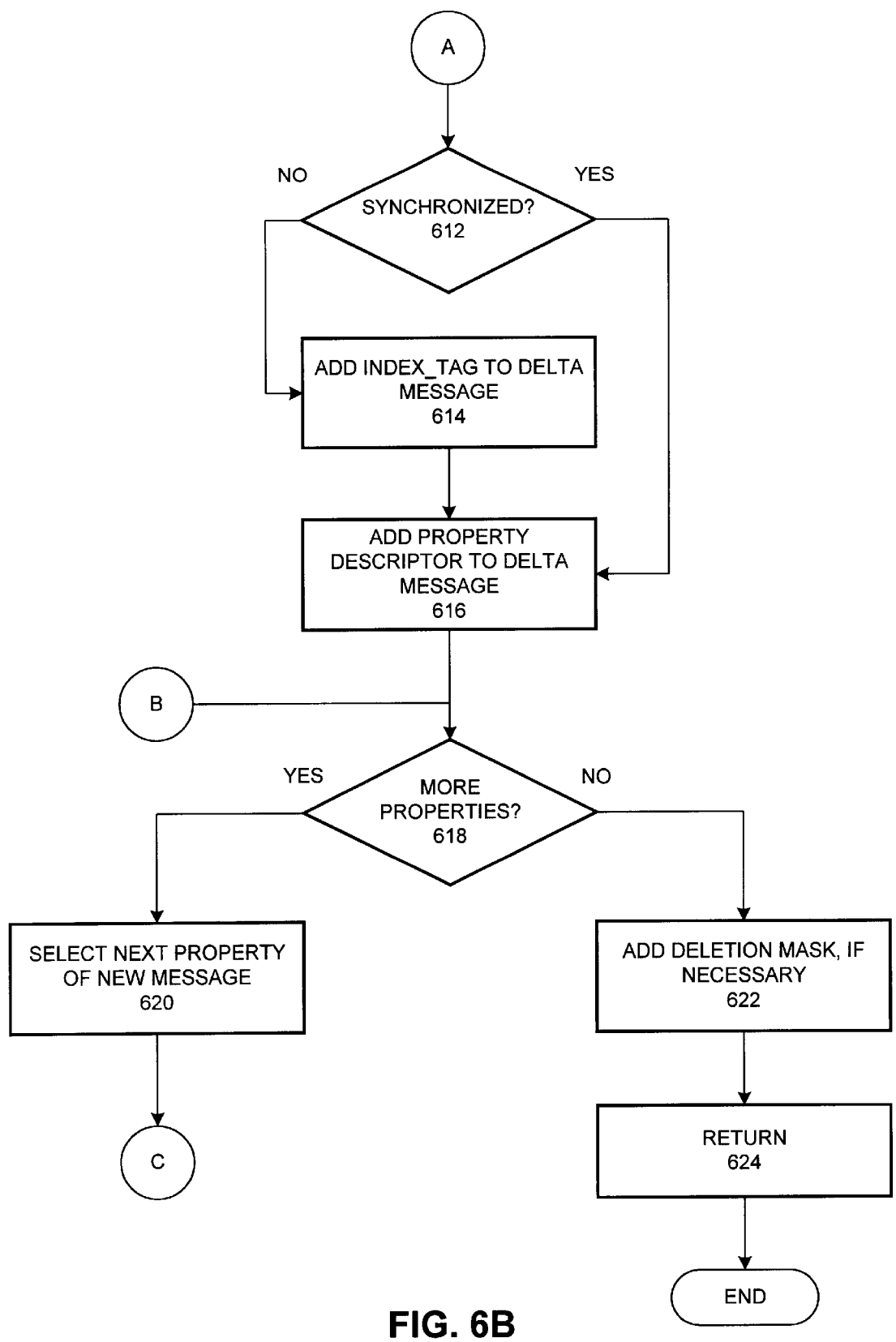
Figure 7A:
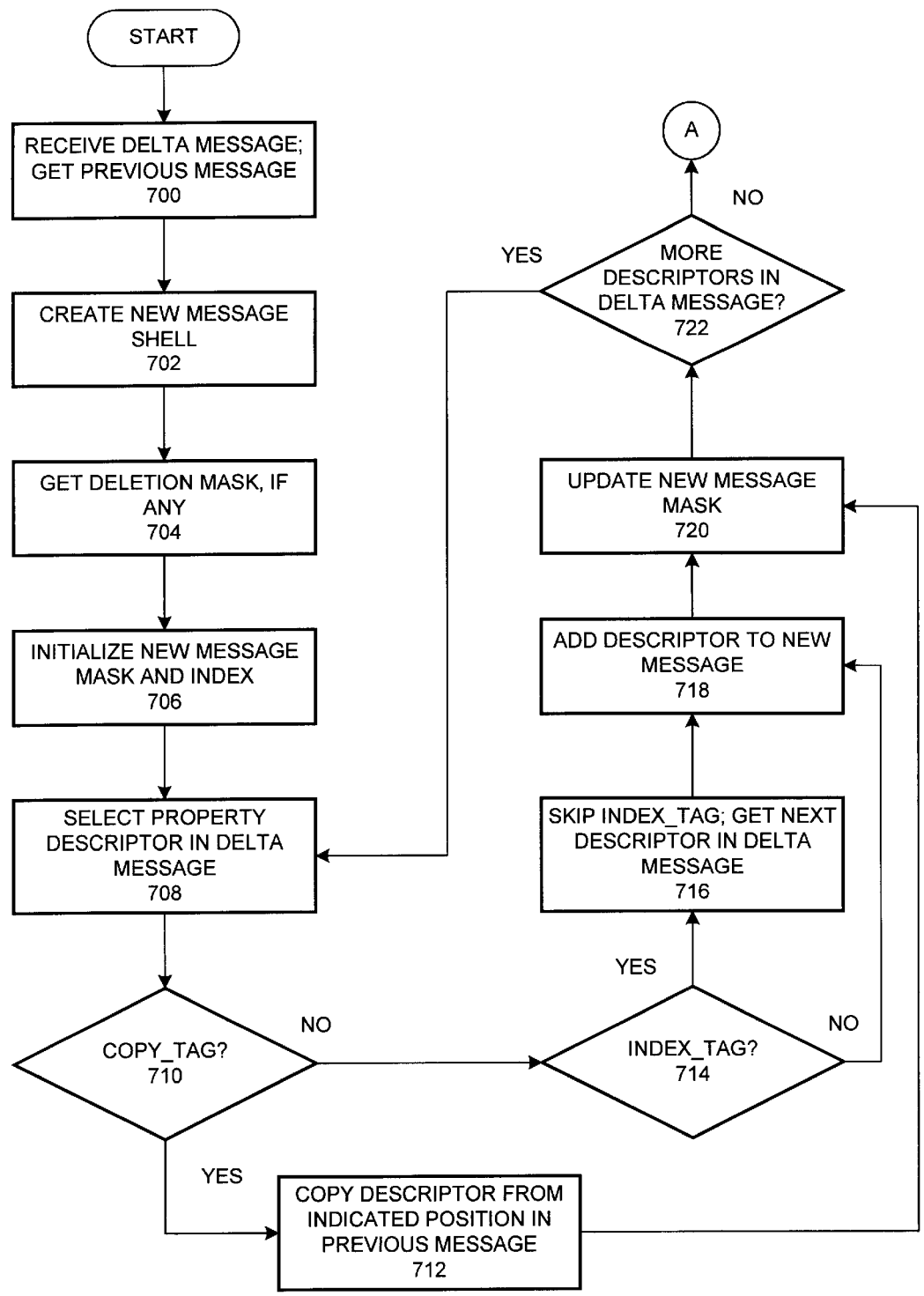
FIGS. 7A–7B comprise a flowchart demonstrating one method of restoring, on a second computing device, a new message from a first computing device based on a delta message and a previous message used to generate the delta message in accordance with an embodiment of the present invention.
Figure 7B:
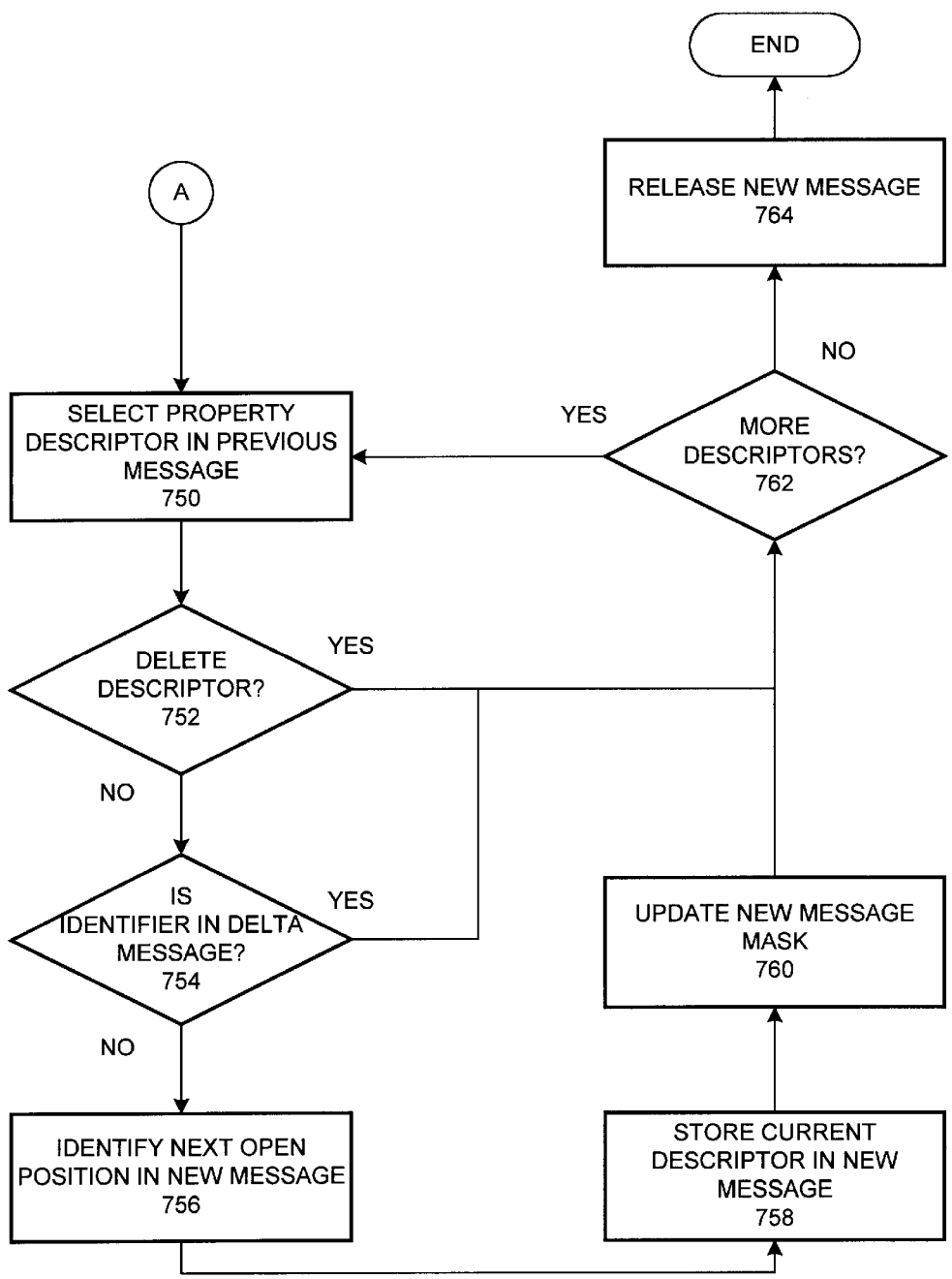

FIG. 5 demonstrates one method of selecting a delta message, if any, to be sent from computer 120 in place of the new message, while FIGS. 6A–6B demonstrate one method of generating one delta message for the new message based on a previously sent message. FIGS. 7A–7B demonstrate a method of restoring the new message on computer 110 based on a delta message and the previous message used to generate the delta message.

With reference now to FIG. 5, a new message to be sent from computer 120 to computer 110 is prepared or is being composed in state 500. As with other methods of reducing the size of a message described in previous sections, the present method may be applied to a new message that is in a specified format (e.g., format 200 of FIG. 2) or to individual components (e.g., property descriptors) that may be combined to form a new message. Thus, the new message need not be in a completed format before it can be reduced.

In state 502 a previous message sent from computer 120 to computer 110 (and which is stored in message memory 126 of message module 122) is selected for generating a delta message. Illustratively, delta messages are only created from previous messages that are of the same type, as indicated in the message type field of message format 200 for example.

In state 504 computer 120 attempts to create a delta message, from the selected previous message, that will be able to communicate the contents (e.g., property data) of the new message in less space. One suitable procedure for creating a delta message is described in detail in FIGS. 6A–6B and the accompanying text.

In state 506, computer 120 determines how much space (e.g., in bytes) is saved, if any, by the delta message. If the delta message creation process was unsuccessful, it is considered as if no space (e.g., zero bytes) were saved.

In state 508 it is determined whether to attempt to create another delta message for the new message using another message previously sent from computer 120 to computer 110. In one embodiment of the invention message memory 126 stores a maximum of four messages or, alternatively, a maximum of four messages of each type. In this embodiment, a delta message is generated for each stored message of the same type as the new message. If another delta message is to be created or attempted, the illustrated procedure returns to state 502.

In state 510, computer 120 determines whether any delta messages were generated that saved space in comparison to the new message. If not, the illustrated procedure continues at state 516 where the new message is sent to computer 110 and is stored in message memory 126. After state 516 the procedure ends.

Otherwise, if at least one delta message saves space in comparison to the new message, in state 512 a delta message that saves the most space (e.g., measured in bytes) is selected. Then, in state 514 the selected delta message is transmitted to computer 110 in place of the new message. After state 514 the procedure ends.

FIGS. 6A–6B demonstrate a method of generating a delta message from a new message and a previously transmitted message, in the embodiment of the invention described in conjunction with FIG. 5. In the illustrated method, a previous message is already selected from which to create the delta message. As described above, in one embodiment of the invention the procedure may be applied to multiple previous messages in order to generate multiple delta messages from which to choose one.

In the embodiment of FIGS. 6A–6B, computer 120 examines each property descriptor in the new message in turn and the previous message is searched for a property descriptor having the same property identifier. If no such match is found, then the new message property descriptor is copied into the delta message. If a match is found, then the property type and value are examined. If these also match, then the property descriptor need not be placed in the delta message because it is already in the previous message that computer 110 will use to recreate the new message. However, in this embodiment it is desirable to retain the original position of the property descriptor in the new message when it is recreated on computer 110. Thus, if the property type and value match, an indicator may be placed in the delta message to ensure that computer 110 can identify the proper position for the property descriptor.

If the property type and value do not match, then a property descriptor is placed in the delta message to reflect the value and type of the property descriptor of the new message. An indicator may also be employed in this situation in order to ensure that the property descriptor is restored in its correct position when the new message is recreated.

With reference now to FIGS. 6A–6B, in state 600 an empty or shell delta message is created. In this embodiment of the invention an empty delta message may adhere to the same message format of the new and previous messages (e.g., message format 200 of FIG. 2). Illustratively, though, an empty delta message may be assigned a new message type of "create_delta" so that computer 110 can quickly differentiate it from a normal create, update, get or destroy object message. In one embodiment of the invention an "update_delta" message type is also enabled. Illustratively, an update_delta message describes the contents of a new message on the basis of a previous update message and allows a sequence of update_delta messages to sequentially update an object on the receiving computer.

The empty delta message created in state 600 also includes the object class and object identifier of the new message. The previous message that is used to generate the delta message is identified in the delta message. In this embodiment, a separate field of the delta message (e.g. delta index 216 in FIG. 2) may store an index or other identifier of the previous message. Because the message memories of computer 120 and computer 110 are managed in the same manner in this embodiment of the invention, they should store the same items after each message is sent from computer 120 to computer 110. Thus, computer 120 may store the index of the previous message (from message memory 126) in the delta index field. Computer 110 may examine this value upon receipt of the delta message and then retrieve the previous message (from message memory 116).

Also in state 600, one or more counters, variables or other data structures used in the creation of the delta message may be initialized. In the illustrated method of the invention a delta message attempts to maintain the integrity of a new message by not only recreating the data (e.g., value and type) but also the position of individual property descriptors within the new message.

Thus, in one implementation of this method a first index, which may be termed New_index, reflects the index of the current property descriptor in the new message. In particular, the New_index tracks the position in the new message of the property descriptor currently being examined or transformed into a descriptor in the delta message. Another index, termed Previous_index, refers to the position of a property descriptor in the previous message that is being used to generate the delta message. A counter, termed Delta_counter, tracks how many descriptors have been placed in the delta message. As described below, New_index and Delta_counter may be compared to determine whether they are synchronized.

In state 602 the first property descriptor of the new message is examined, particularly the property identifier.

In state 604 computer 120 searches the previous message for the selected property identifier. If no match is found, the illustrated procedure advances to state 612. Otherwise, if there is a property descriptor in the previous message that has an identical property identifier, then the procedure continues at state 606.

In state 606 computer 120 compares the type and value in the selected property descriptor of the new message to the type and value in the descriptor of the previous message that has an identical property identifier. If the type and value also match, then the illustrated procedure continues at state 608; otherwise, if the types and values do not match, then the procedure advances to state 612.

In state 608, computer 120 determines whether the index of the matching property descriptor of the previous message matches the index of the present property descriptor of the new message. If they do match, the illustrated procedure advances to state 618. Otherwise, computer 120 must ensure that computer 110 can restore the present property descriptor to its same position when the new message is recreated.

Therefore, in state 610 a Copy_Tag is added to the delta message with the index (e.g., Previous_index, as described above) of the matching property descriptor in the previous message. Illustratively, a Copy_Tag appears as a property descriptor having a special, distinctive property identifier field. The value of Previous_index may be stored in the type and/or data fields of the property descriptor. When computer 110 gets to the position in the delta message at which the Copy_Tag is stored, it understands to copy into that same position of the new message the property descriptor that is stored at the indicated position in the previous message. After state 610, the illustrated procedure continues at state 618.

In state 612 it is determined whether the delta message is synchronized with the new message. In particular, computer 120 determines whether a descriptor added to the delta message for the current descriptor of the new message would be added at the same position in the delta message as the current descriptor in the new message.

Assume, for example, a situation in which the first property descriptor of the new message is currently being examined (e.g., New_index=zero) and Delta_counter indicates that no descriptors have yet been placed in the delta message (e.g., Delta_counter=zero). The index and counter are considered synchronized in this situation because if a descriptor were placed in the delta message on behalf of the current property descriptor of the new message, it would be placed in the same position as the current property descriptor. As another example, assume that the value of New_index is three while Delta_counter has a value of one. In this case the delta message and new message are not synchronized because a descriptor placed in the delta message for the current property descriptor of the new message would not be in the correct position.

Thus, in state 612 some comparison may be made between the position of the current property descriptor of the new message and the status of (e.g., number of entries in) the delta message. If there is synchronization, then the illustrated procedure advances to state 616; otherwise the procedure continues at state 614. As will be understood from the preceding and following description, one reason that synchronization may be lost is that a property descriptor of the new message may be identical to one in the previous message, in which case it need not be included in the delta message.

In state 614 computer 120 adds an Index_Tag to the delta message to achieve or maintain synchronization. The Index_Tag helps computer 110 recreate the current property descriptor in the correct position when it recreates the new message from the delta message. Illustratively, an Index_Tag appears as a property descriptor having a special, distinctive property identifier field. The Index_Tag indicates (e.g., via the type and/or data field) the position, relative to an index within the new message, where computer 110 should place the following descriptor(s) in the delta message.

In state 616, the current property descriptor of the new message is copied into the delta message.

In state 618 computer 120 determines whether there are any additional property descriptors in the new message that need to be examined. If the last one has already been handled, then the illustrated procedure advances to state 622.

Otherwise, if at least one more descriptor must be processed, then in state 620 another property descriptor is selected and the procedure returns to state 604.

In state 622 computer 120 determines whether any of the property descriptors of the previous message must be deleted by computer 110 when recreating the new message. Because the delta message indicates how the new message differs from the previous message, computer 110 must remove any extraneous entries (i.e., descriptors) of the previous message. In the illustrated embodiment, a deletion mask (e.g., a bitmask) is constructed to indicate to computer 110 which, if any, of the property descriptors of the previous message should be deleted. Illustratively, the deletion mask is stored in a property descriptor (e.g., the last descriptor) of the delta message, with a distinctive property identifier. The value field of the descriptor may hold the mask while the type field may be omitted, blank or ignored. Illustratively, each position (e.g., bit) of a deletion mask reflects whether the corresponding entry (e.g., property descriptor) in the previous message should be deleted.

In state 624 the delta message creation procedure returns the delta message if it is smaller in size than the new message or, if not smaller, it returns some special value or indicator (e.g., zero, null). The procedure then ends.

FIGS. 7A–7B demonstrate a method of reconstructing a new message on computer 110 from the delta message sent by computer 120 according to the embodiment of FIGS. 5–6.

In state 700, computer 110 receives the delta message from computer 120, examines the message, identifies it as a delta message (e.g., by its message type field), reads the delta index and retrieves the previous message from message memory 116 based on the delta index.

In state 702, computer 110 creates a shell for the new message by copying the message type from the previous message and the object class and object identifier from the delta message.

In state 704 the deletion mask, if there is one, is retrieved from the delta message. Illustratively, computer 110 may just parse the delta message and examine each property descriptor in turn to determine (e.g., by its property identifier) whether it is a deletion mask.

In state 706 a mask (e.g., a bitmask) separate from the deletion mask, to be used to indicate the status of the new message as it is reconstructed, is initialized. Illustratively, each mask position (e.g., bit) corresponds to one property descriptor of the new message, and the initialization procedure entails setting each position in the mask to zero to indicate that no property descriptors have been added to the new message yet. Also in state 706, an index for the new message is initialized (e.g., set to zero).

In state 708 a property descriptor in the delta message is selected and its property identifier, type and values are read. Illustratively, each descriptor will be visited in turn.

In state 710 computer 110 determines whether the current property descriptor of the delta message comprises a Copy_Tag (described above in conjunction with FIGS. 6A–6B). The presence of a Copy_Tag may be determined by a special value in the property identifier field of the current descriptor. If the descriptor is not a Copy_Tag, the illustrated procedure continues at state 714.

Otherwise, in state 712 computer 110 retrieves the property descriptor at the position within the previous message that is indicated in the Copy_Tag. This retrieved descriptor is then placed into the position in the new message indicated by the new message index. The illustrated procedure then advances to state 720.

In state 714 computer 110 determines whether the current property descriptor of the delta message comprises an Index_Tag (described above in conjunction with FIGS. 6A–6B). As discussed above, in this embodiment of the invention an Index_Tag may be detected based on a particular value stored in the property identifier field of the current property descriptor. If the descriptor does contain an index tag, the illustrated procedure advances to state 718.

Otherwise, in state 716 the index for the new message (e.g., the new message index) is set to the value indicated in the Index_Tag (e.g., stored in the value field of the selected property descriptor). In addition, this delta message property descriptor (i.e., comprising the index tag) is skipped and the next descriptor in the delta message is selected and its value and type fields are read, thus making it the current property descriptor.

In state 718 the current property descriptor (e.g., its property identifier, type and value) is copied into the new message at the position of the new message index.

In state 720 the position (e.g., bit) in the new message mask corresponding to the new message index is set (e.g., to a value of one) to indicate that that position in the new message has been populated.

In state 722 computer 110 determines whether any additional descriptors in the delta message need to be examined. If so, the new message index is incremented by one and the illustrated procedure returns to state 708 to select the next descriptor. Otherwise, if all delta message descriptors have been processed, the procedure continues at state 750.

In state 750 a first property descriptor of the previous message is selected and its property identifier, type and value are read. As described above, the previous message may be identified by its index in message memory 116 of computer 110, which index is illustratively included in the delta message received from computer 120.

In state 752 the deletion mask (if any) is referenced to determine if the selected descriptor in the previous message is marked for deletion. If so, the illustrated procedure advances to state 762 determine whether to select another descriptor in the previous message. Otherwise the procedure continues at state 754.

In state 754 computer 110 determines whether the property identifier of the current descriptor of the previous message is in the delta message. This may occur, for example, if the new message had a descriptor with the same property identifier as the current descriptor of the previous message but had a different value in the value field. If the property identifier of the current descriptor of the previous message is in the delta message then the illustrated procedure advances to state 762.

Otherwise, in state 756 the first or next unused position in the new message is identified. In the illustrated embodiment of the invention this may entail examining the new message mask to find an appropriate position (e.g., indicated by a value of zero).

In state 758 the current descriptor of the previous message is stored at the chosen position in the new message. In other words the property identifier, type and value of the current descriptor are copied into the new message position.

In state 760 the new message mask is updated. Illustratively, the position in the new message mask at which the current descriptor was stored is marked (e.g., set to one) to indicate that the position is now populated.

In state 762 computer 110 determines whether any property descriptors are left to be processed. If so, the illustrated procedure returns to state 750 to select the next descriptor.

Otherwise, if all descriptors in the previous message have been processed, the new message is yielded or returned in state 764 and the procedure ends.

A Combined Method of Reducing the Size of a Message

Figure 8A:
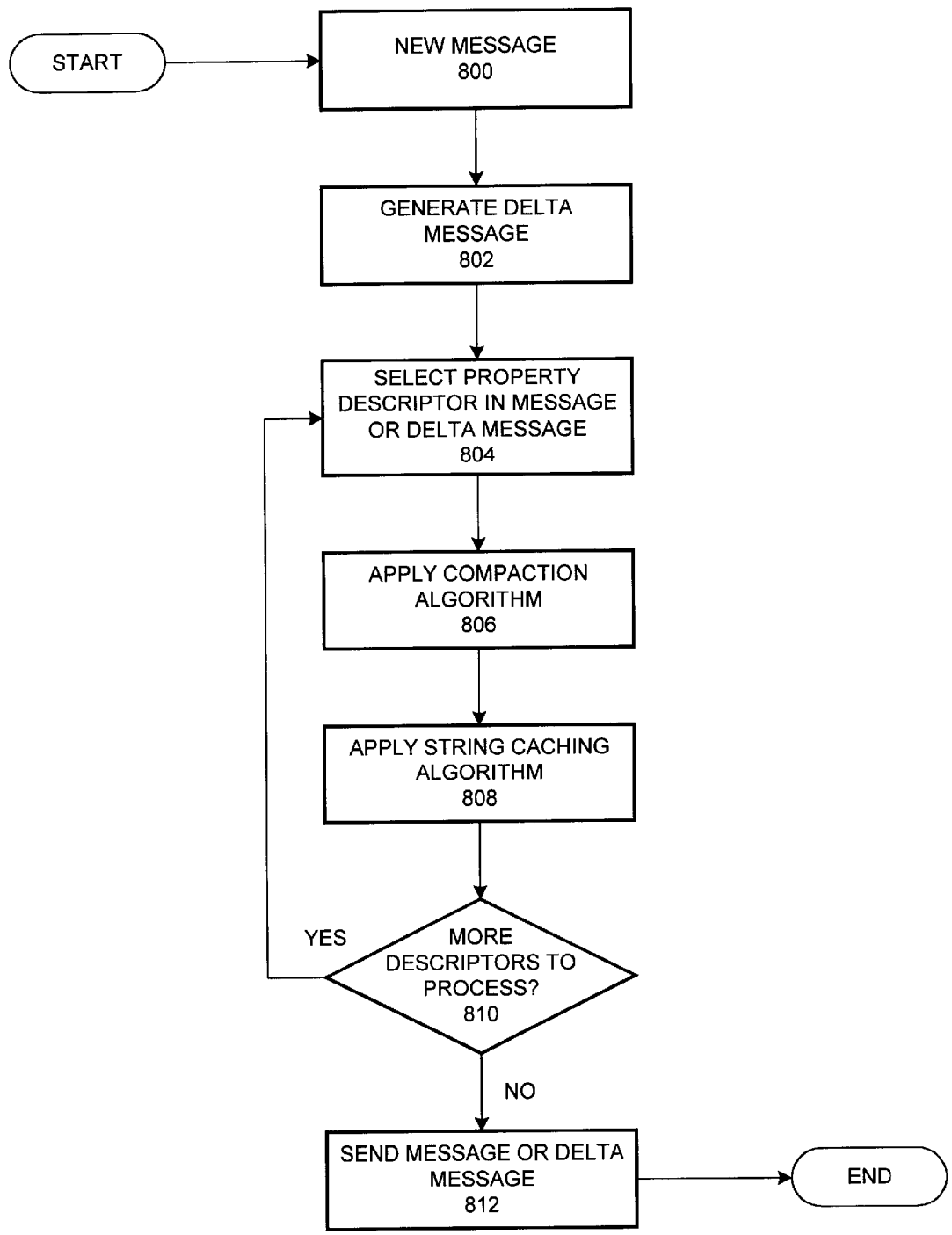
FIGS. 8A–8B comprise a flowchart illustrating one method of reducing, on a first computer, the size of a message sent to a second computer and, on the second computer, recreating the original message, in accordance with an embodiment of the invention.
Figure 8B:
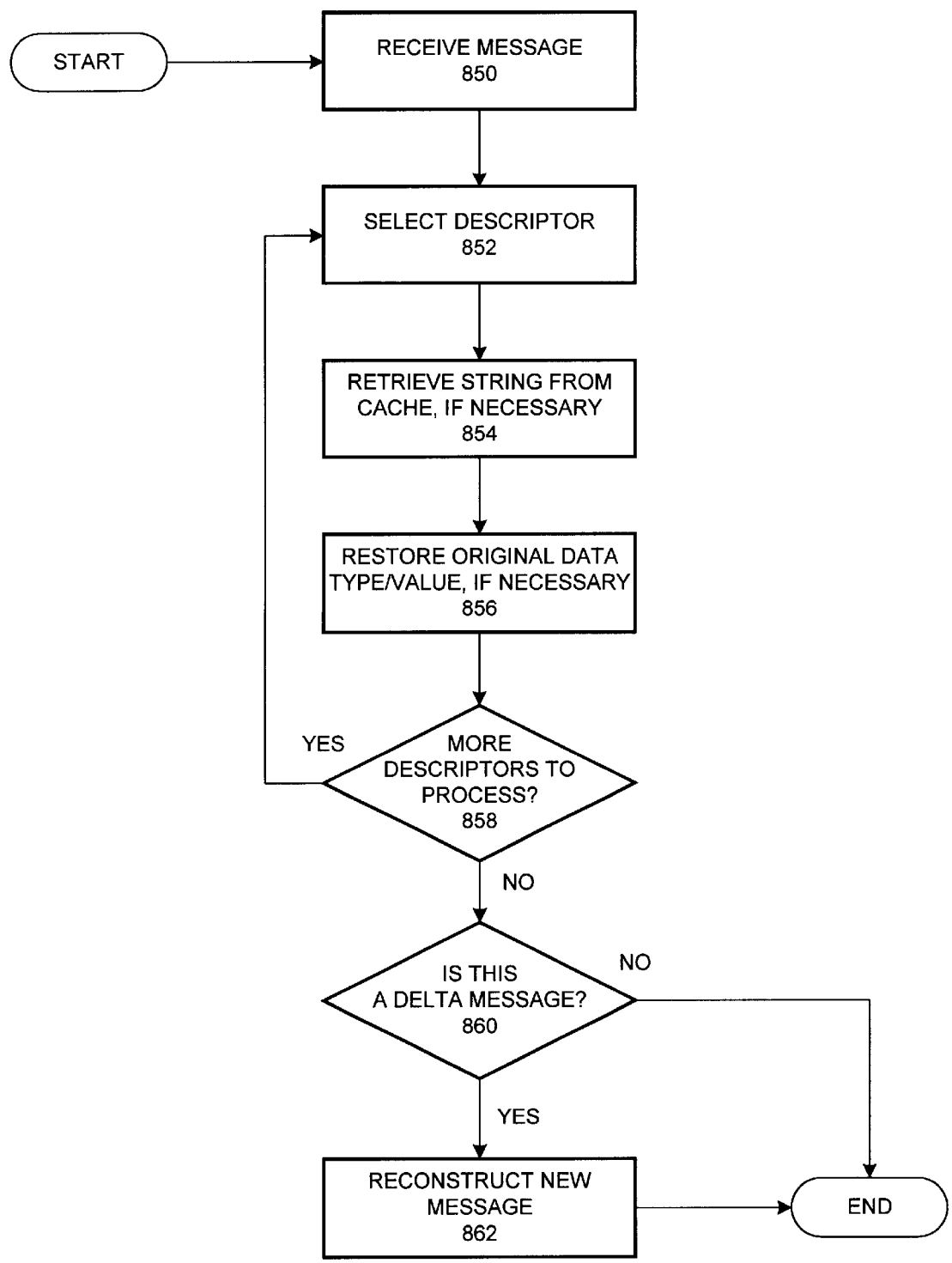

FIGS. 8A–8B demonstrate one procedure, according to the embodiment of the invention depicted in FIG. 1, for applying the methods described in the preceding sections to reduce the size of a message generated by computer 120 for computer 110. The illustrated procedure depicts just one order in which the methods may be applied; other sequences may be applied in other embodiments of the invention.

FIG. 8A demonstrates how computer 120 may reduce the size of a message for computer 110 by first generating a delta message, then applying the data compaction and string caching techniques previously described.

In state 800 components of a new message for computer 110 are assembled (e.g., individual property descriptors). In state 802 a delta message is generated, possibly using a procedure similar to that of FIGS. 6A–6B. The remainder of the procedure illustrated in FIG. 8A is applied to either the new message or the delta message, depending on whether the delta message is smaller than the new message. If the delta message is smaller, then the remaining actions are taken with regard to the delta message; otherwise they are performed on the new message.

In state 804 a property descriptor of either the new message or the delta message is selected. In state 806 a data compaction algorithm such as depicted in FIG. 3 is applied to compact the data value of the descriptor, if possible. In state 808, if the selected descriptor contains a string a string caching technique such as described in FIG. 4 is applied to replace it with an identifier corresponding to the string.

In state 810 computer 120 determines whether additional descriptors need to be examined in the new message or the delta message. If so, the illustrated procedure returns to state 804. Otherwise, in state 812 the message is transmitted to computer 110, after which the procedure ends.

FIG. 8B demonstrates one procedure in which computer 110 may reconstruct the original version of the new message (e.g., prior to any compaction or caching) from the message received from computer 120, which may be a delta message.

In state 850 the message is received at computer 110. In state 852 a descriptor in the received message is selected. In state 854 computer 110 retrieves a string value from string memory if the descriptor contains an identifier of a string. In state 856 an original data type is restored if one of the special data types described above is detected.

In state 858 computer 110 determines whether an additional descriptor in the received message is to be examined. If so, the illustrated procedure returns to state 852. Otherwise, in state 860 computer 110 determines whether the received message is a delta message. If not a delta message, then the procedure ends. Otherwise, if this is a delta message the original new message is reconstructed in state 862, possibly using a procedure similar to that of FIGS. 7A–7B. The procedure then ends.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of reducing the size of a message generated by a first computer for a second computer, comprising:

comparing the message at the first computer to one or more messages previously transmitted to the second computer;

generating a delta message to describe a difference between said message and one of said previous messages;

examining, in one of said message and said delta message, a value and a first data type associated with said value;

replacing said first data type with a second data type requiring less storage space for said value;

comparing a character string in one of said message and said delta message with a set of character strings stored in a first memory of the first computer; and replacing said character string with an identifier of said character string if said character string matches one of said character strings in said set of character strings.

2. The method of claim 1, further comprising transmitting one of said message and said delta message to the second computer.

3. The method of claim 2, wherein said transmitting comprises:

transmitting said delta message if said delta message is smaller than said message; and transmitting said message otherwise.

4. The method of claim 1, wherein said examining comprises determining whether said first data type is a predetermined data type.

5. The method of claim 1, further comprising storing said character string in said first memory.

6. A method of reducing the size of a communication originated on a first computer for transmission to a second computer, the communication identifying an object on the second computer and including one or more descriptors corresponding to properties of the object, the method comprising:

examining a value of a first data field of a communication from a first computer to a second computer, wherein a first data type describes said value;

determining whether said value can be described by a second data type;

replacing said first data type with said second data type;

examining a first sequence of computer readable symbols in a second data field of said communication;

searching a first memory for said first sequence of computer readable symbols, wherein said first memory is configured to store one or more sequences of computer readable symbols and wherein an identifier is associated with each of said one or more sequences of computer readable symbols; and if said first memory includes said first sequence of computer readable symbols, replacing said first sequence of computer readable symbols with said identifier.

7. The method of claim 6, further comprising transmitting said communication to said second computer.

8. The method of claim 6, further comprising storing said character string in said first memory.

9. The method of claim 6, wherein said determining comprises comparing said first data type to a collection of compactable data types.

10. The method of claim 6, further comprising:

generating a delta communication representing a difference between said communication and a communication sent previously to said second computer, wherein said delta communication enables said second computer to reconstruct said communication from said previous communication; and replacing said communication with said delta communication.

11. The method of claim 10, wherein said generating comprises:

selecting a second communication previously sent to said second computer;

copying a first descriptor of a first set of descriptors in said communication into said delta communication, wherein said first descriptor includes a first property identifier that was not included in said second communication;

adding a mask to said delta communication to identify a second descriptor of a second set of descriptors in said second communication, wherein said second descriptor includes a second property identifier that is not included in said communication.

12. A method of transmitting a delta message from a first computing device to a second computing device in place of an original message, comprising:

identifying an original message on a first computing device for transmission to a second computing device, wherein said original message pertains to an object on the second computing device and includes a first set of descriptors corresponding to a first set of properties of said object and wherein each descriptor in said first set of descriptors includes a property identifier;

selecting a previous message transmitted from the first computing device to the second computing device, wherein said previous message pertains to said object and includes a second set of descriptors corresponding to a second set of properties of said object and wherein each descriptor in said second set of descriptors includes a property identifier;

creating a delta message in which to describe said original message in relation to said previous message;

selecting a first descriptor of said original message;

determining whether a first property identifier of said first descriptor matches a second property identifier of a second descriptor of said previous message;

if said first property identifier matches said second property identifier, determining whether a data value in said first descriptor matches a data value in said second descriptor;

adding said first descriptor to said delta message; and transmitting said delta message, in place of said original message, from the first computing device to the second computing device.

13. The method of claim 12, further comprising:

if any property identifiers in said second set of descriptors are not in said first set of descriptors, adding a mask to said delta message to identify each descriptor in said second set of descriptors having a property identifier not included in said first set of descriptors.

14. The method of claim 12, further comprising identifying in said delta message the location in said original message of said first descriptor.

15. The method of claim 12, further comprising prior to said transmitting:

examining a data value in a descriptor of said delta message;

examining a first data type in said descriptor, wherein said first data type describes said data value;

determining whether said data value can be described by a second data type that requires less space in said delta message for said data value; and replacing said first data type with said second data type.

16. The method of claim 12, further comprising prior to said transmitting:

examining a data value in a descriptor of said delta message;

searching a first memory of the first computing device for said data value;

if said data value is stored in said first memory, replacing said data value with an identifier associated with said data value in said first memory; and if said data value is not stored in said first memory, storing said data value in said first memory.

17. A computer readable storage medium storing instructions that, when executed by a computer, cause the computer to perform a method of reducing the size of a message generated by a first computer for a second computer, the method comprising:

comparing the message at the first computer to one or more messages previously transmitted to the second computer;

generating a delta message to describe a difference between said message and one of said previous messages;

examining, in one of said message and said delta message, a value and a first data type associated with said value;

replacing said first data type with a second data type requiring less storage space for said value;

comparing a character string in one of said message and said delta message with a set of character strings stored in a first memory of the first computer; and replacing said character string with an identifier of said character string if said character string matches one of said character strings in said set of character strings.

18. An application server in a network environment, comprising:

a delta message module configured to generate a delta message to describe a new message for a client on the basis of a first previous message transmitted to the client;

a compaction module configured to change a data type associated with a value stored in one of said new message and said delta message from a first type requiring a first amount of storage space to a second type requiring less than said first amount of storage space;

a data memory configured to store one or more data values previously sent from the application server to the client; and a data replacement module configured to replace a series of computer readable symbols in one of said new message and said delta message with an identifier, wherein said identifier represents a storage location in said data memory of said series of computer readable symbols.

19. The application server of claim 18, further comprising a message memory configured to store one or more messages previously transmitted to the client, including said first previous message.

20. A computer readable medium storing instructions that, when executed by a computer, cause the computer to perform a method of reducing the size of a communication originated on a first computer for transmission to a second computer, the communication identifying an object on the second computer and including one or more descriptors corresponding to properties of the object, the method comprising:

examining a value of a first data field of a communication from a first computer to a second computer, wherein a first data type describes said value;

determining whether said value can be described by a second data type;

replacing said first data type with said second data type;

examining a first sequence of computer readable symbols in a second data field of said communication;

searching a first memory for said first sequence of computer readable symbols, wherein said first memory is configured to store one or more sequences of computer readable symbols and wherein an identifier is associated with each of said one or more sequences of computer readable symbols; and if said first memory includes said first sequence of computer readable symbols, replacing said first sequence of computer readable symbols with said identifier.

21. A computer readable medium storing instructions that, when executed by a computer, cause the computer to perform a method of transmitting a delta message from a first computing device to a second computing device in place of an original message, the method comprising:

- identifying an original message on a first computing device for transmission to a second computing device, wherein said original message pertains to an object on the second computing device and includes a first set of descriptors corresponding to a first set of properties of said object and wherein each descriptor in said first set of descriptors includes a property identifier;
- selecting a previous message transmitted from the first computing device to the second computing device, wherein said previous message pertains to said object and includes a second set of descriptors corresponding to a second set of properties of said object and wherein each descriptor in said second set of descriptors includes a property identifier;
- creating a delta message in which to describe said original message in relation to said previous message;
- selecting a first descriptor of said original message;
- determining whether a first property identifier of said first descriptor matches a second property identifier of a second descriptor of said previous message;
- if said first property identifier matches said second property identifier, determining whether a data value in said first descriptor matches a data value in said second descriptor;
- adding said first descriptor to said delta message; and
- transmitting said delta message, in place of said original message, from the first computing device to the second computing device.

* * * * *